(12) United States Patent
Buzan et al.

(10) Patent No.: US 6,239,582 B1
(45) Date of Patent: May 29, 2001

(54) MOTOR VEHICLE ALTERNATOR HAVING A SINGLE VOLTAGE SENSOR AND A HALF-WAVE CONTROLLED RECTIFIER BRIDGE FOR INCREASING OUTPUT

(75) Inventors: Forrest T. Buzan, Wakefield; Geoffrey B. Lansberry, Hingham; Keith D. Szolusha, Boston, all of MA (US)

(73) Assignee: SatCon Technology Corporation, Cambridge, MA (US)

( * ) Notice: Subject to any disclaimer, the term of this patent is extended or adjusted under 35 U.S.C. 154(b) by 0 days.

(21) Appl. No.: 09/434,004

(22) Filed: Nov. 4, 1999

(51) Int. Cl.[7] .................................................. H02P 9/44
(52) U.S. Cl. .............................. 322/20; 320/137; 322/28
(58) Field of Search ................................ 322/19, 20, 22, 322/25, 28, 29; 363/84, 145; 320/137, 162

(56) References Cited

U.S. PATENT DOCUMENTS

| | | | |
|---|---|---|---|
| 3,673,489 | 6/1972 | Riff | 322/28 |
| 3,760,259 | 9/1973 | Tharman | 322/28 |
| 4,431,959 | 2/1984 | Remmers | 320/147 |
| 4,459,536 | 7/1984 | Wirtz | 322/10 |
| 4,489,323 | 12/1984 | Glennon et al. | 363/87 |
| 5,473,240 | 12/1995 | Moreira | 318/801 |
| 5,590,032 | 12/1996 | Bowman et al. | 363/15 |
| 5,606,244 * | 2/1997 | Migdal | 322/7 |
| 5,642,021 | 6/1997 | Liang et al. | 318/146 |
| 5,648,705 * | 7/1997 | Sitar et al. | 318/145 |
| 5,663,631 | 9/1997 | Kajiura et al. | 322/29 |
| 5,694,311 | 12/1997 | Umeda et al. | 363/89 |
| 5,719,484 * | 2/1998 | Taniguchi et al. | 322/20 |
| 5,719,486 | 2/1998 | Taniguchi et al. | 322/28 |
| 5,729,120 * | 3/1998 | Stich et al. | 323/237 |
| 5,739,677 * | 4/1998 | Tsutsui et al. | 322/25 |
| 5,742,498 | 4/1998 | Taniguchi et al. | 363/145 |
| 5,793,167 | 8/1998 | Liang et al. | 318/141 |
| 6,081,084 * | 6/2000 | Crecelius | 318/254 |
| 6,144,190 * | 11/2000 | Scott et al. | 322/25 |

FOREIGN PATENT DOCUMENTS

3432128 A1    3/1985  (DE) .

\* cited by examiner

*Primary Examiner*—Nicholas Ponomarenko
(74) *Attorney, Agent, or Firm*—G. W. Neuner; G. W. Hartnell; Dike Bronstein Roberts & Cushman IP Group (57) ABSTRACT

An alternator system having a single voltage sensor and a half-wave controlled rectifier bridge for increasing/decreasing alternator output power is disclosed. The half-wave controlled rectifier bridge includes three diodes and three active switches. The alternator system further includes a controlled field winding coupled to a three-phase stator winding; a battery; and, a controller for controlling the active switches and the field winding for increasing/decreasing the alternator output power. The controller uses edges sensed by the single voltage sensor for determining optimum activation and deactivation times for the three active switches in the bridge, and then controlling the switches in accordance with the determined optimum switching times.

10 Claims, 8 Drawing Sheets

MOTOR VEHICLE ALTERNATOR HAVING A SINGLE VOLTAGE SENSOR AND A HALF-WAVE CONTROLLED RECTIFIER BRIDGE FOR INCREASING OUTPUT

BACKGROUND OF THE INVENTION

1. Field of the Invention

This invention relates generally to actively controlled generators, and more particularly to an actively controlled alternator for a motor vehicle having a battery and auxiliary electronic loads, which require varying levels of electronic power to be delivered from the alternator and the battery at a set voltage level.

2. Background

A conventional motor vehicle alternator includes a three-phase stator winding, and a rotor magnetically coupled to the stator and driven by the motor vehicle's engine. As the rotor is driven, three-phase power is generated at output connections of the stator winding and rectified by a three-phase diode rectifier bridge, which is traditionally a full-wave diode rectifier bridge.

Generally, the full-wave diode rectifier bridge limits the output power of the conventional motor vehicle alternator, especially at idle speed, which may be characterized as approximately 1500 rpm and 150 Hz electrical frequency.

This is because the natural commutation of diodes included in the full-wave diode rectifier bridge typically forces the phase angle between phase currents and phase voltages at the output connections of the stator winding to be equal to 0 radians, thereby restricting the magnitude of the phase currents of the stator winding and therefore limiting the alternator output power.

This limitation in the alternator output power may be overcome by introducing active switching elements in place of at least some of the diodes in the full-wave diode rectifier bridge. For example, the active switching elements can be activated and deactivated for adjusting the phase angle between the phase currents and the phase voltages of the stator winding. In this way, the phase angle between the phase voltages and a back electromagnetic force (EMF) generated in the phases of the stator winding can also be adjusted, thereby increasing both the magnitude of the phase currents of the stator winding and the alternator output power.

One difficulty in implementing such an active rectifier bridge is in determining the timing of the active switching elements relative to the position and the flux of the rotor. Prior alternator systems have included various combinations of position, voltage, and/or current sensors for determining the timing of the active switches.

For example, in U.S. Pat. No. 5,793,167 ("the '167 patent") issued Aug. 11, 1998, to Liang et al., a system for increasing alternator output power is described. In accordance with that disclosure, the conventional full-wave diode rectifier bridge is replaced with a full-wave controlled rectifier bridge having controlled switches in place of diodes. The rectifier bridge is controlled in response to a third harmonic of the voltage generated by the alternator, thereby synchronizing the rectifier bridge with the alternator. The alternator includes a rotor having a field winding that receives a field current, which is controlled up to a maximum value for partially controlling the alternator output power. The power produced by the alternator is also partially controlled by introducing a phase angle between phase voltages at the three output connections of the stator winding and the third harmonic, up to a maximum or optimum phase angle. In order to increase the alternator output power, the field current is increased up to the maximum value before any phase angle is introduced between the phase voltages and the third harmonic. Similarly, in order to decrease the alternator output power, the phase angle is reduced to 0 radians before the field current is reduced.

However, the system for increasing alternator output power described in the '167 patent has some drawbacks. For example, that system requires a third harmonic detector circuit for combining the three phase voltages and the neutral N from the stator winding, thereby generating a third harmonic within the voltage generated by the alternator. The third harmonic must then be further processed for generating a fundamental frequency output pulse for each of six pulses of the third harmonic voltage signal. The electronics required for implementing the third harmonic detector and for subsequently processing the third harmonic significantly increase the overall cost and complexity of the system.

In addition, in U.S. Pat. No. 5,648,705 ("the '705 patent") issued Jul. 15, 1997, to Sitar et al., a system for increasing alternator output power at low speeds using a controlled, rectifier bridge is described. In accordance with that disclosure, both a current detector and a voltage detector are used for measuring the state of one phase of the three-phase stator winding; and, this information is passed on to a controller, which uses the information to control a full-wave controlled rectifier bridge for optimizing the phase shift between a back EMF in the stator winding and phase voltages at the three output connections of the stator winding. The function of the system described in the '705 patent can be understood by referring to FIG. 5 of the '705 patent. That drawing describes a prior art Lundell alternator including a conventional diode rectifier. For the Lundell alternator such as is commonly used in motor vehicles, the power angle, $\beta$, represents the angle between the back EMF and the phase voltage, V. As shown in FIG. 5 of the '705 patent, a conventional diode rectifier bridge has an angle of 0 radians between a phase current, I, and the phase voltage, V. The resulting power angle, $\beta$, is therefore less than $\pi/2$ radians, which results in a low output power.

Accordingly, it is desirable to increase the power angle, $\beta$. To avoid the use of rotation sensors, and because the back EMF cannot be directly measured during loading of the alternator because it cannot be electromagnetically separated from the armature current (reaction), the system of the '705 patent measures both the current and the voltage of a single phase of the stator winding. Using these measurements, the synchronous frequency of the alternator can be determined, thereby determining certain information about the back EMF. This information can then be used to maintain a phase shift, $\forall$, between the phase current and its corresponding phase voltage to maximize output power, as shown in FIG. 4 of the '705 patent. The phase shift, $\forall$, can be induced by controlling the switching of the rectifier bridge. The control strategy described in the '705 patent uses a phase current detector and a phase voltage detector to estimate the position of the back EMF from the determined phase current and phase voltage. This estimated position provides an existing delay angle between the phase current and the phase voltage; and, this existing delay angle is compared with a desired delay angle read from experimentally determined optimal values in a look-up table. The switching of the rectifier bridge is then controlled for matching the existing delay angle with the desired delay angle.

However, the system for increasing alternator output power described in the '705 patent also has the drawback that both current and voltage must be measured, thereby requiring two sensors and electronics for gathering and processing the two measurements, and therefore increasing the cost and complexity of the system.

Other relevant patent documents include U.S. Pat. No. 5,473,240 (the '240 patent) issued Dec. 5, 1995, to Moreira; U.S. Pat. No. 5,663,631 (the '631 patent) issued Sep. 2, 1997, to Kajiura et al.; U.S. Pat. No. 5,694,311 (the '311 patent) issued Dec. 2, 1997, to Umeda et al.; U.S. Pat. No. 5,719,486 (the '486 patent) issued Feb. 17, 1998, to Taniguchi et al.; and, U.S. Pat. No. 5,742,498 (the '498 patent) issued Apr. 21, 1998 to Taniguchi et al.

Briefly, the '240 patent describes a method and an apparatus for controlling operation of a brushless, permanent magnet motor, wherein signals containing third harmonic components of the motor flux density are acquired and filtered to isolate the third harmonic components. The filtered third harmonic components are then integrated to produce a time integral signal; the back EMF of one stator phase is sensed and the resulting EMF signal is filtered; and, zero crossings of the filtered signals are sensed and used to drive an inverter controller.

The '631 patent describes a full-wave-rectifying-circuit composed of six diodes and six transistors inversely connected in parallel with the diodes. A phase-control-circuit has three magnetic sensors, each of which corresponds to one of the phase-windings and is positioned so as to lag by an electric angle of $\pi/2$ radians to provide digital signals that lag by an electric angle of $2\pi/3$ radians behind the induced-phase-signal. The six transistors are driven by the digital signals to form controlled AC voltages that lag behind the induced line voltages by an electric angle of $2\pi/3$ radians so that the alternator increases the output power without increase of the body size.

The '311 patent describes a power supply system having a three-phase alternating current generator, a storage battery, and a three-phase rectifying device connected between the alternating current generator and the storage battery. The rectifying device includes three SiC-MOSFETS, which are turned on when the corresponding alternating voltage is positive and turned off when the corresponding alternating voltage is negative. A duty control device switches each of the three SiC-MOSFETS on and off according to a selected duty ratio so that the alternating current generator can generate an optimum voltage proportional to a rotational speed of a rotor of the alternating current generator.

The '486 patent describes a generating apparatus including a generator, first and second rectifiers, and a voltage regulator. The generator has three-phase star-connected armature windings, which generate three-phase high-output voltage at phase-terminals and low-output voltage at a neutral point. The first rectifier is a three-phase full-wave rectifier connected between the phase-winding and a high-voltage load, and the second rectifier is a diode connected between the neutral point and a low-voltage load with a battery. The regulator regulates the high output voltage to energize the high-voltage load and, at the same time, the low-output voltage to become an optimum voltage level for charging the battery. MOSFETs may be used for the first rectifier to short-circuit the armature windings, thereby supplying them with leading currents, which are respectively ahead of the high-output voltages, so as to increase the generator output power.

The '498 patent describes an alternator including MOSFET's used as rectifiers which are sealed by a sealing member (e.g., a molded epoxy resin) together with heat radiating fins and an external input/output terminal plate. The sealing member can evenly dissipate stress even if the radiating fins, terminal plate, and the like vibrate with different phases. Since the rectifying elements are reliably secured even when subjected to great vibrations, damage to the MOSFET's can be suppressed. The MOSFET's are never exposed to atmospheric air since the MOSFET's are sealed by the sealing member. Therefore, the alternator can improve the MOSFET's resistance against adverse operational conditions.

Although the systems, methods, and apparatuses mentioned above have been used for increasing alternator/generator output power, there is a need for an alternator system with increased output power that maintains a set battery voltage level, is both reliable and low-cost, and does not rely upon a plurality of sensors for controlling the output power.

SUMMARY OF THE INVENTION

The present invention provides an alternator system that uses both field and phase control techniques for increasing/decreasing output power to auxiliary electronic loads while maintaining battery voltage to a set voltage level.

According to one embodiment of the present invention, the alternator system includes a half-wave controlled rectifier bridge; a single voltage trigger for controlling commutation timing; a controller; and, a battery. The single voltage trigger is derived from a voltage sensed at a terminal node of the half-wave controlled rectifier bridge, and processed by the controller. Further, edges sensed at the terminal node provide references needed to synchronize the gating of three active switches included in the half-wave controlled rectifier bridge with the alternator rotor position. At least one of the rotor field current and the stator voltage phase angle is then used for adjusting alternator output power and controlling the battery voltage to a desired level. Advantageously, no sensors other than the single voltage sensor are required for determining the alternator rotor position.

Still further advantages will become apparent from a consideration of the ensuing description and drawings.

BRIEF DESCRIPTION OF THE DRAWINGS

The invention will be better understood by reference to the following more detailed description and accompanying drawings in which.

DETAILED DESCRIPTION OF THE INVENTION

Figure 1:
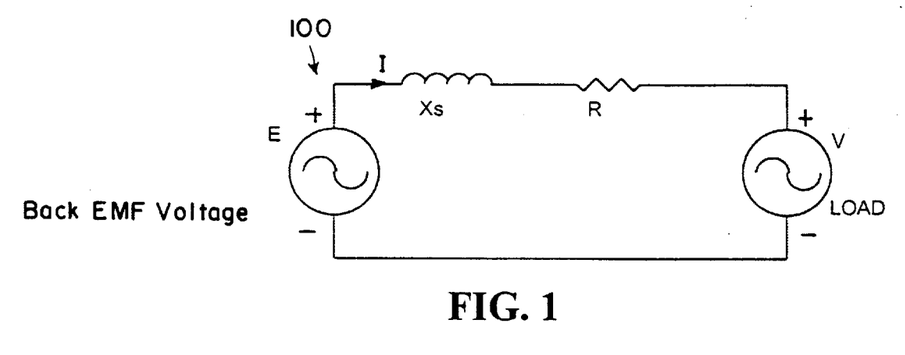
FIG. 1 is a schematic diagram of an equivalent circuit of one phase of a synchronous machine having a uniform air gap.

FIG. 1 shows an equivalent circuit 100 of a conventional synchronous machine having uniform air gap (not shown), which will be described and analyzed for providing technical background for an alternator system in accordance with the present invention. The equivalent circuit 100 corresponds with a single phase of the conventional synchronous machine. Specifically, E is a voltage or back electromagnetic force (EMF) generated in the phases of a stator winding by a rotating flux wave produced by a driven rotor, which is magnetically coupled to the stator winding. Further, V is the load voltage imposed upon the stator winding through a rectifier. V is therefore also known as the stator voltage. Further, both E and V are phasor quantities. Accordingly, the difference between the respective magnitudes and phases of E and V causes a phase current, I, to flow through the stator winding, as shown in the following equation:

$$E-V=I(R+jX_s) \qquad (1)$$

where R and $X_s$ are the resistance and the synchronous reactance, respectively, of the stator winding of the single phase of the conventional synchronous machine. Further, in the equivalent circuit 100, the load includes the rectifier, and the motor vehicle battery and auxiliary electronic loads. The stator voltage, V, is therefore an AC voltage.

Figure 2:
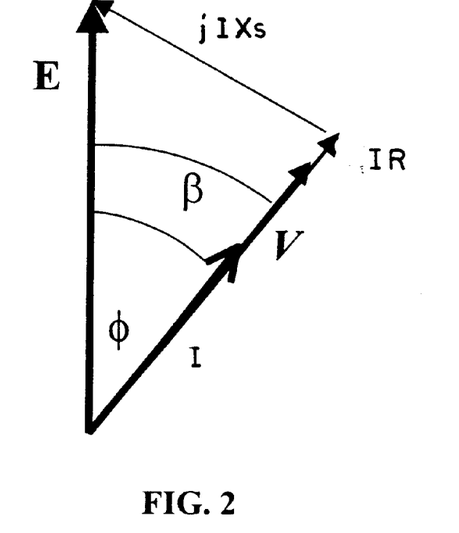
FIGS. 2 through 4 are phasor diagrams illustrating various electrical parameters of the synchronous machine of FIG. 1.

FIG. 2 shows a phasor diagram for the equivalent circuit 100. Specifically, $\phi$ is the angle between the back EMF, E, and the phase current, I; and, $\beta$ is the angle between the back EMF, E, and the stator voltage, V. Accordingly, the power transferred from the driven rotor to the stator, also known as the air gap power or the input power, is given by the following equation:

$$P_{in}=EI\cos(\phi) \qquad (2)$$

which is the dot product of the back EMF, E, and the phase current, I.

In addition, the output power is given by the following equation:

$$P_{out}=VI\cos(\beta-\phi) \qquad (3)$$

which is the dot product of the stator voltage, V, and the phase current, I.

Figure 3:
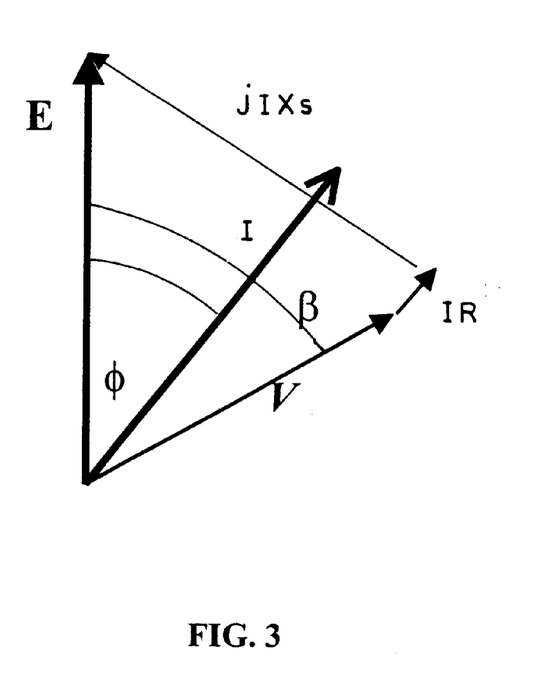
Figure 4:
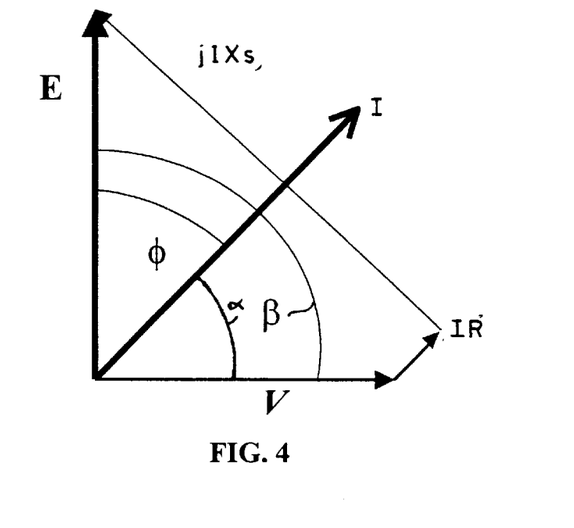

The magnitude of the back EMF, E, is determined by the alternator speed and the rotor flux. Further, the direction of the back EMF, E, is fixed with the rotor angle, and is shown in FIGS. 2 through 4 along a vertical axis. In addition, the magnitude of the stator voltage, V, is limited by the battery voltage.

FIG. 2 shows a "zero-phase-shift" condition, which is typically observed when using the conventional full-wave diode rectifier bridge. The fundamental physics of diodes requires that the current flowing through a diode and the voltage potential across the diode be in phase. This means that a positive current flows only when a positive voltage is applied across the diode; and, when a negative voltage is applied across the diode, no current flows. Accordingly, FIG. 2 shows that the stator voltage, V, and the phase current, I, are directly in phase; i.e., the angle, $\alpha$, between V and I is equal to 0 radians; and, the angle, $\beta$, equals the angle, $\phi$.

However, when an active rectifier bridge is used in place of the conventional full-wave diode rectifier bridge, the phase constraint between the stator voltage, V, and the phase current, I, is removed. As a result, the phase of V can be set independently from the phase of I; and, both the magnitude and the phase of I can be adjusted for balancing the voltages E and V according to equation (1). In this way, alternator output power can be increased or decreased.

For example, FIG. 3 shows the effect of delaying the stator voltage, V, relative to the back EMF, E. Specifically, as V rotates away from E, the phase current, I, increases due to the increasing phase difference between V and E. This increase in the magnitude of I also causes an increase in the input power, $P_{in}$, (see equation (2)), despite the decreasing power factor as the angle, $\alpha$, between V and I increases.

FIG. 4 shows the effect of continued delaying of the stator voltage, V, relative to the back EMF, E, thereby causing a decrease in the output power, $P_{out}$. For example, FIG. 4 shows V lagging behind E by $\pi/2$ radians. Because the output power, $P_{out}$, is defined in equation (3) as the dot product of the stator voltage, V, and the phase current, I, it can be seen by comparing the projection of I onto V in FIG. 4 with the projection of I onto V in FIG. 3 that the delay of V shown in FIG. 3 produces more output power, $P_{out}$, than the delay of V shown in FIG. 4. The optimum delay angle, $\beta$, depends on the system parameters, including the inductance and resistance, the back EMF, and the battery voltage.

One difficulty in using an active rectifier bridge in place of the conventional full-wave diode rectifier bridge, whether or not the active rectifier bridge is full-wave or half-wave, is knowing the position of the rotor and therefore the direction of the back EMF, E. This information is important in knowing when to activate and deactivate the switches in the active rectifier bridge, thereby optimally delaying the stator voltage, V, for increasing or decreasing output power as needed. The present invention provides this information using the active rectifier bridge, while maintaining low-cost and reliability comparable to the passive diode rectifier bridge.

Figure 5:
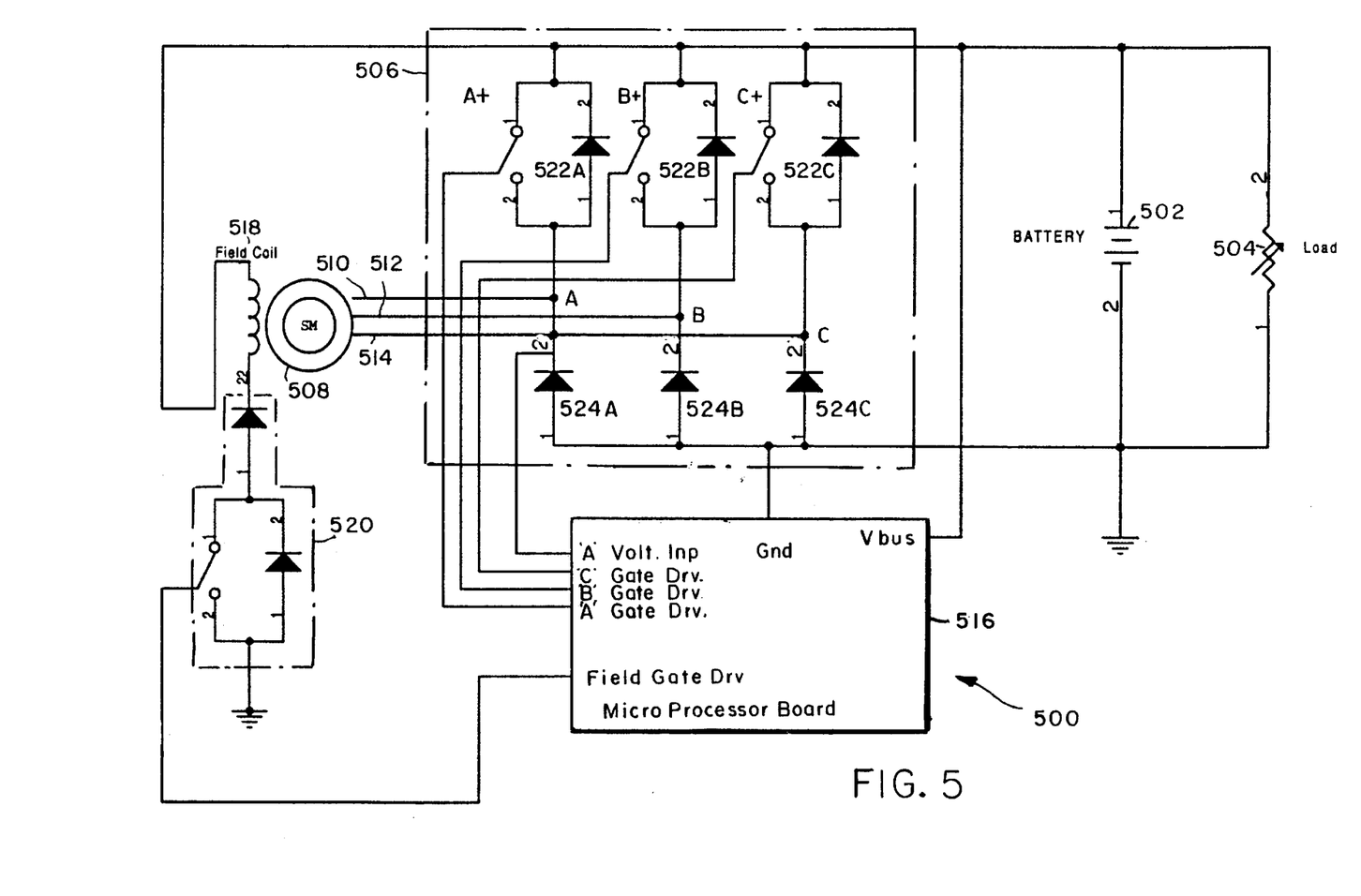
FIG. 5 is a schematic diagram of a motor vehicle alternator system in accordance with the present invention.

FIG. 5 shows a schematic diagram of a motor vehicle alternator system 500 in accordance with the present invention. The alternator system 500 includes a battery 502 and a load 504, which includes auxiliary electronic loads (not shown) of a motor vehicle. The alternator system 500 further includes a half-wave controlled rectifier bridge 506, which has three (3) power switches A+, B+, and C+ and three (3) anti-parallel power diodes 522A, 522B, and 522C in an upper portion (not numbered) of the bridge 506; and, three (3) isolated power diodes 524A, 524B, and 524C in a lower portion (not numbered) of the bridge 506. The power switches A+, B+, and C+ are preferably implemented as MOSFETs; however, any suitable controlled switch devices may alternatively be used.

Further, the alternator system 500 includes a stator (not shown) with a three-phase stator winding 508 having output connections 510, 512, and 514 coupled to terminals A, B, and C of the controlled rectifier bridge 506; and, a rotor (not shown) with a controlled field winding 518 magnetically coupled to the stator winding 508. The alternator system 500 also includes a controller 516 for controlling the activation and deactivation of the switches A+, B+, and C+ and for sensing a timing trigger, $V_A$, (see FIGS. 6, 7, and 9) at the terminal A across the diode 524A. The controller 516 is also coupled to a field control circuit 520 for controlling an excitation current provided to the controlled field winding 518.

Specifically, the timing trigger, $V_A$, is the phase voltage at the terminal A relative to the ground potential of the battery 502. Accordingly, when the isolated diode 524A is conducting current, the phase voltage, $V_A$, is approximately equal to 0 volts; and, when the anti-parallel diode 522A and/or the switch A+ is conducting current, the phase voltage, $V_A$, is approximately equal to the positive voltage of the battery 52. Further, a Schmitt trigger device (not shown) may be used for more clearly defining voltage transitions of the timing trigger, $V_A$, from 0 volts to the positive battery voltage and vice versa.

Figure 6A:
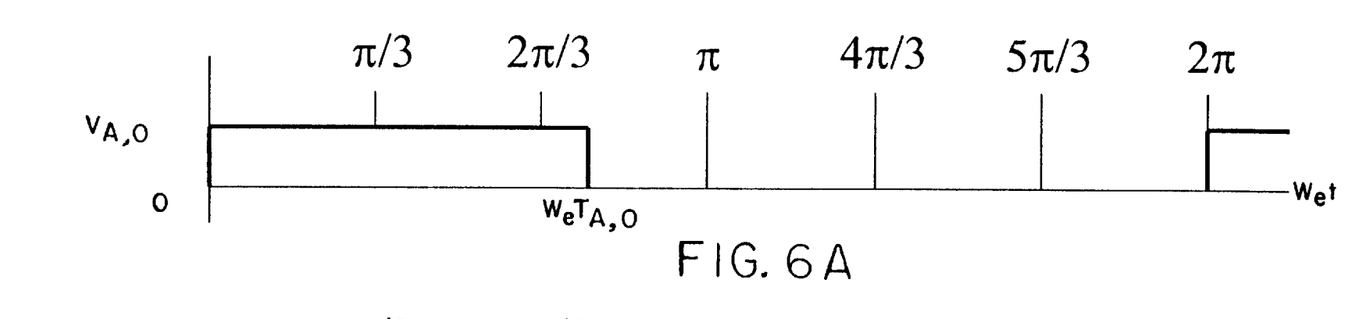
FIGS. 6A and 6B are timing diagrams showing a single phase voltage trigger and a corresponding phase current for a conventional half-wave diode rectifier bridge.
Figure 7A:
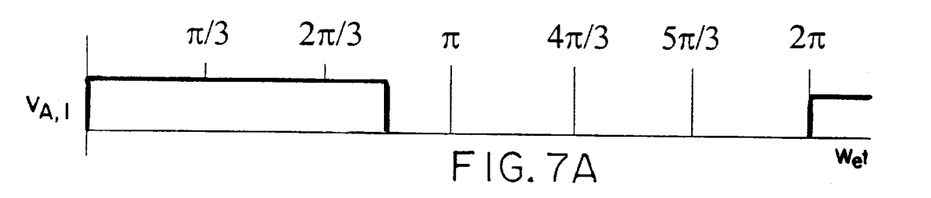
FIGS. 7A and 7B are timing diagrams showing the single phase voltage trigger and the corresponding phase current for a half-wave controlled rectifier bridge included in the alternator system of FIG. 5.
Figure 9A:
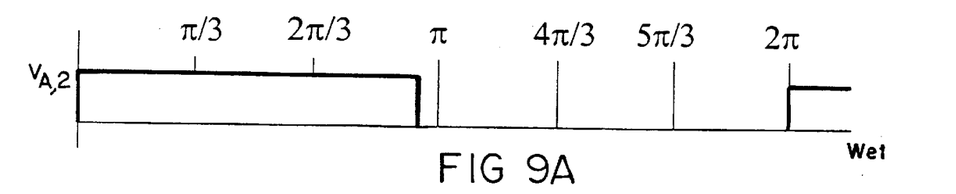
FIGS. 9A and 9B are timing diagrams showing the single phase voltage trigger and the corresponding phase current for providing increased alternator output power.

The leading edge of the timing trigger, $V_A$, occurs due to the natural commutation of the diodes 522A and 524A of the controlled rectifier bridge 506. For example, FIGS. 6, 7, and 9 show the leading edge of the timing trigger, $V_A$, occurring at electrical angles 0 and $2\pi$ radians. Accordingly, during operation of the alternator system 500, the leading edge of the timing trigger, $V_A$, occurs periodically every $2\pi$ radians.

Further, this natural commutation of the diodes 522A and 524A is caused by the changing direction of the back EMF, E, in the phases of the stator winding 508. Because the rotating flux wave produced by the rotor generates the back EMF, E, in the phases of the stator winding 508, the leading edge of the timing trigger, $V_A$, is an indication of the position of the rotor and therefore the direction of the back EMF, E. The leading edge of the timing trigger, $V_A$, can therefore be advantageously used as a reference when activating and deactivating the switches A+, B+, and C+ in the controlled rectifier bridge 506, thereby adjusting the delay of the stator voltage, V, relative to the back EMF, E, for increasing or decreasing alternator output power for, e.g., charging the battery 502 and/or providing power to the auxiliary load 504.

Figure 6B:
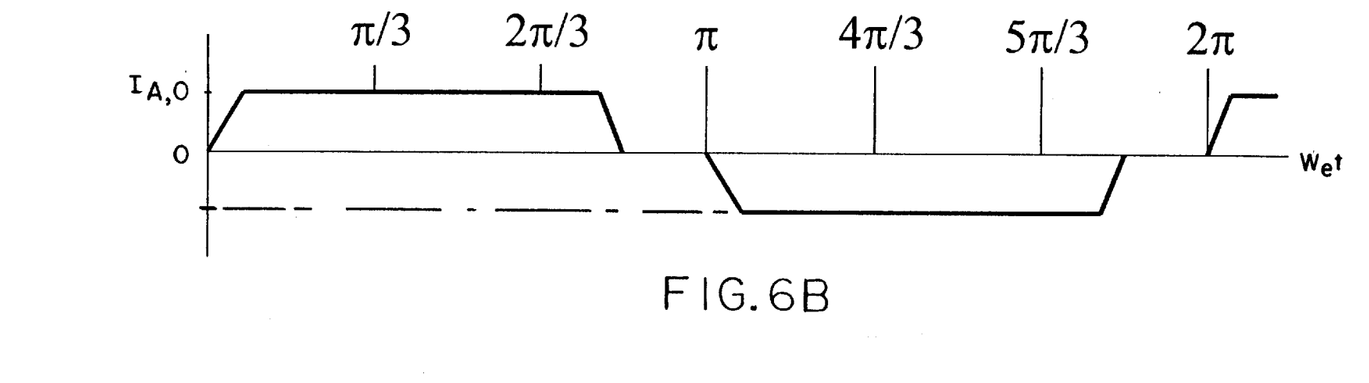

For example, FIGS. 6A and 6B show the natural commutation of the diodes 522A and 524A at the terminal A with the switch A+ in its deactivated or "open" position. As shown in FIG. 6A, the leading edge of the phase voltage, $V_{A,0}$, occurs at the electrical angles 0 and $2\pi$; and, the phase voltage, $V_{A,0}$, approximately equals the positive voltage of the battery 502 for a duty cycle of $T_{A,0}$ when the diode 522A is conducting current, and 0 volts when the diode 524A is alternatively conducting current. FIG. 6B shows a corresponding phase current, $I_{A,0}$, which is in phase with the phase voltage, $V_{A,0}$.

Figure 7B:
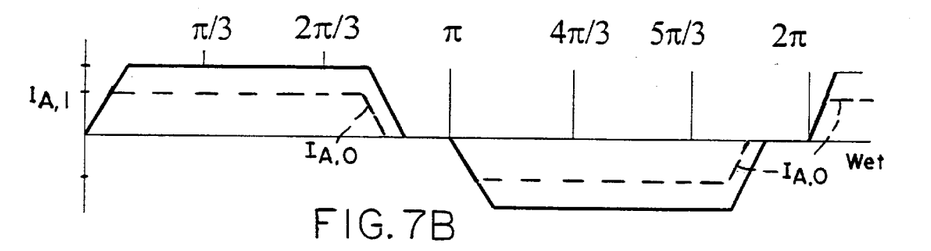

FIGS. 7A and 7B show the commutation of the diodes 522A and 524A at the terminal A with the switch A+ in its activated or "closed" position during a programmed duty cycle of $T_{A+,1}$ (see FIG. 8), which is equal to the duty cycle of $T_{A,0}$. Again, FIG. 7A shows that the leading edge of the phase voltage, $V_{A,1}$, occurs at the electrical angles 0 and $2\pi$; and, the phase voltage, $V_{A,1}$, approximately equals the positive voltage of the battery 502 for a duty cycle of $T_{A,1}$ when the switch A+ is activated, and 0 volts when the switch A+ deactivated and the diode 524A is conducting current. FIG. 7B shows a corresponding phase current, $I_{A,1}$, which again is in phase with the phase voltage, $V_{A,1}$.

As shown in FIG. 7B, the magnitude of the phase current, $I_{A,1}$, is slightly greater than the magnitude of the phase current, $I_{A,0}$, even though the phase voltage, $V_{A,1}$, is still in phase with the phase current, $I_{A,1}$. This is because of the superior conductivity of the switch A+ as compared with the diode 522A. Because $|I_{A,1}|>|I_{A,0}|$, it takes slightly longer for the magnitude of $I_{A,1}$ to ramp down to zero (0) Amps due to the constant dI/dt rating of the stator winding 508. As a result, the diode 522A is forced to conduct current for a slightly longer period of time, thereby causing the duty cycle, $T_{A,1}$, to be slightly longer than the duty cycle, $T_{A,0}$.

Figure 8:
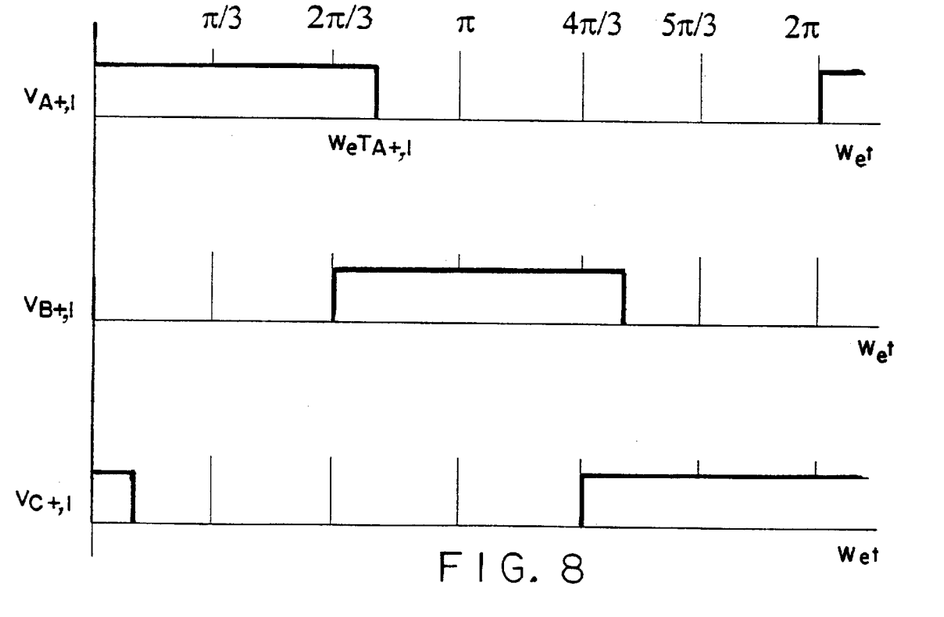
FIG. 8 is a timing diagram showing gate transitions corresponding with the phase voltage trigger and the phase current of FIGS. 7A and 7B.

In addition, FIG. 8 shows a drive signal, $V_{A+,1}$, for driving the switch A+ during the duty cycle of $T_{A+,1}$; a drive signal, $V_{B+,1}$, for driving the switch B+; and, a drive signal, $V_{C+,1}$, for driving the switch C+. The derivation of the relative timing and duty cycles of the drive signals $V_{A+,1}$, $V_{B+,1}$, and $V_{C+,1}$ for the switches A+, B+, and C+, respectively, will be explained in detail later in this specification.

Figure 9B:
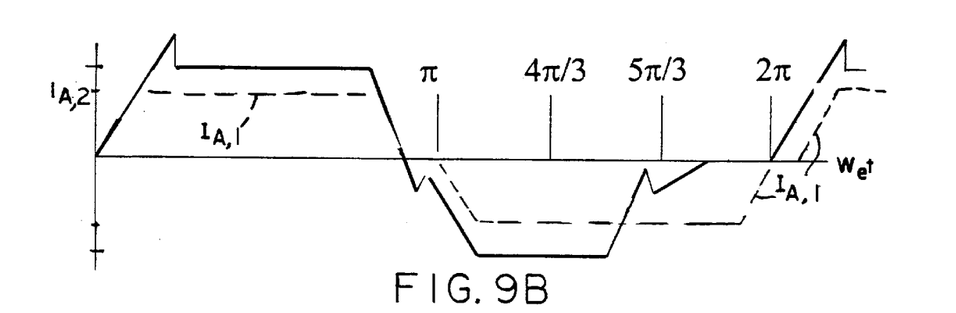
Figure 10:
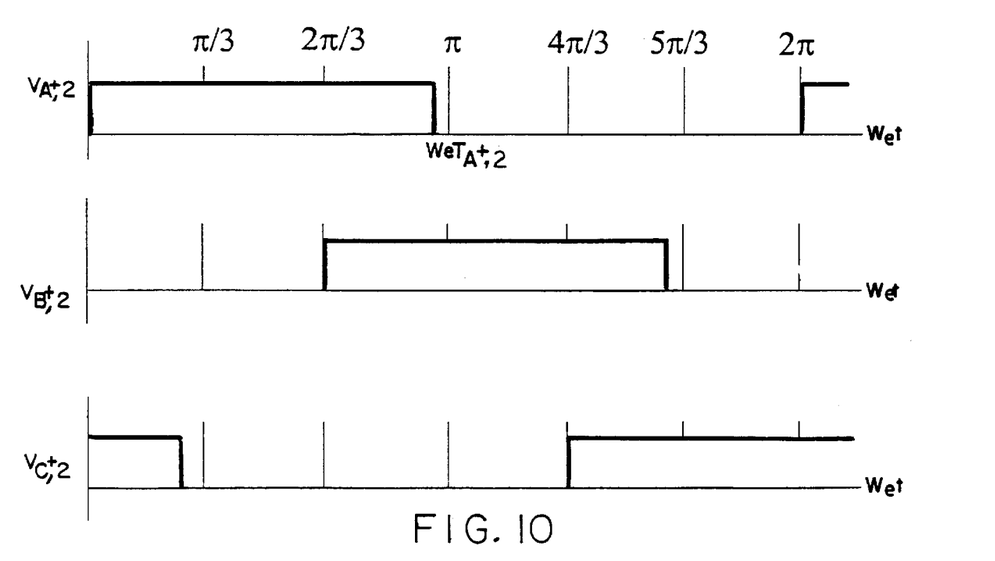
FIG. 10 is a timing diagram showing gate transitions corresponding with the phase voltage trigger and the phase current of FIGS. 9A and 9B.

FIGS. 9A and 9B show the commutation of the diodes 522A and 524A at the terminal A with the switch A+ in its activated or "closed" position for a programmed duty cycle of $T_{A+,2}$ (see FIG. 10), which is greater than the duty cycle of $T_{A+,1}$. Again, FIG. 9A shows that the leading edge of the phase voltage, $V_{A,2}$, occurs at the electrical angles 0 and $2\pi$; and, the phase voltage, $V_{A,2}$, approximately equals the positive voltage of the battery 502 for approximately the duty cycle of $T_{A+,2}$ when the switch A+ activated, and 0 volts when the switch A+ deactivated and the diode 524A is conducting current.

Further, FIG. 9B shows a phase current, $I_{A,2}$, which not only is greater than the phase current, $I_{A,1}$, but also is no longer completely in phase with the corresponding phase voltage, $V_{A,2}$. This is because the programmed duty cycle, $T_{A+,2}$, for the drive signal, $V_{A+,2}$, is greater than the duty cycle, $T_{A+,1}$, for the drive signal, $V_{A+,1}$. Similarly, duty cycles for the drive signals $V_{B+,2}$ and $V_{C+,2}$ are greater than corresponding duty cycles for the drive signals $V_{B+,1}$ and $V_{C+,1}$. As explained above, by programmably activating and deactivating the switches A+, B+, and C+ relative to the leading edge of the phase voltage, $V_A$, at terminal A, the stator voltage, V, can be delayed relative to the back EMF, E, thereby increasing or decreasing the alternator output power. Because the switches A+, B+, and C+ are programmably activated and deactivated for increasing the duty cycles of the drive signals $V_{A+,2}$, $V_{B+,2}$, and $V_{C+,2}$, the stator voltage, V, is suitably delayed relative to the back EMF, E; the magnitude of the phase current, $I_{A,2}$, is increased; and, therefore the alternator output power is increased.

It should be noted that the phase current, $I_{A,2}$, as shown in FIG. 9B is more jagged as compared with the phase current, $I_{A,1}$, shown in FIG. 7B. This is because the drive signal, $V_{A+,2}$, activates or "closes" the switch A+ during times when the magnitude of the phase current, $I_{A,2}$, is non-zero. When the switch A+ deactivates or "opens," the phase current, $I_{A,2}$, continues to flow due to the inductance in the stator winding 508; i.e., the phase current, $I_{A,2}$, finds a path by forcing the diode 524A "open." This does not occur in a passive rectifier bridge. Similarly, because the phase voltage and the phase current are in phase, this typically does not occur in an active rectifier bridge without phase shifting. An active rectifier bridge must normally account for this continued flow of phase current or suffer voltage spikes on the bridge; e.g., by adding capacitance across the bridge. Such voltage spikes may be observed at each of the terminals A, B, and C of the bridge when the corresponding switch A+, B+, or C+ is opened.

As explained above, the leading edge of the phase voltage, $V_{A,2}$, results from the natural commutation of the diodes 522A and 524A. The leading edge of the phase voltage, $V_{A,2}$, is an indication of the position of the rotor, and is therefore suitable as a reference for activating and deactivating the switches A+, B+, and C+ in the controlled rectifier bridge 506 for increasing or decreasing the alternator output power.

Figure 11:
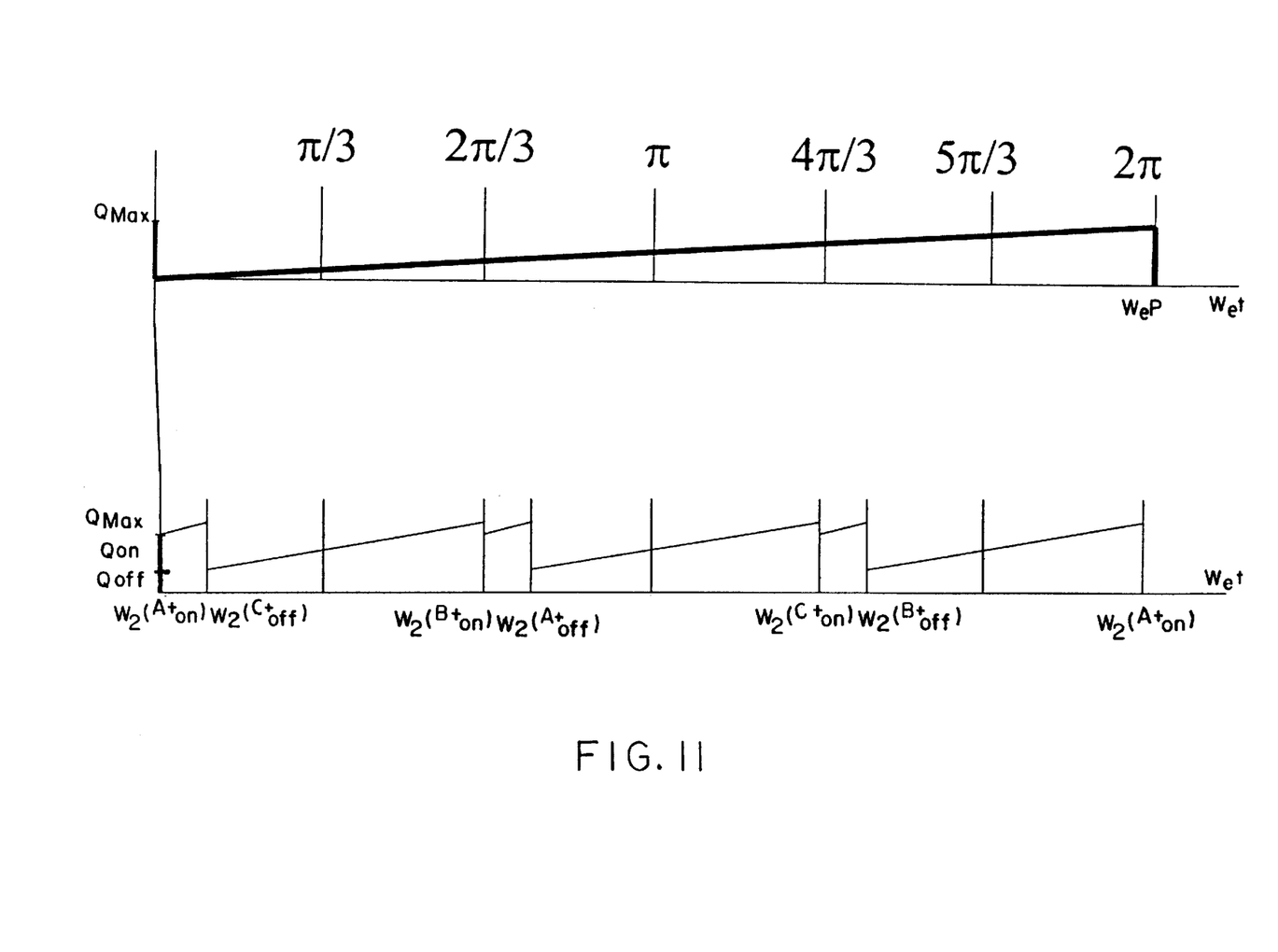
FIG. 11 is a timing diagram showing a cycle length and gate transitions corresponding with the phase voltage trigger and power switches of the half-wave controlled rectifier bridge.

For example, FIG. 11 is a timing diagram showing representative outputs of a cycle counter (not shown) and a gate transition counter (not shown) included in the alternator system 500. Specifically, the upper timing diagram of FIG. 11 represents the output of the cycle counter running from a count of zero (0) at electrical angle 0 radians to a maximum count, $Q_{MAX}$, at electrical angle $2\pi$ radians. As explained above, the electrical angles 0 and $2\pi$ radians correspond with a leading edge of the phase voltage, $V_A$, which is the reference used when activating and deactivating the switches A+, B+, and C+ in this illustrative embodiment of the present invention.

Accordingly, a first leading edge of the phase voltage, $V_A$, is used for triggering the cycle counter; and, consecutive leading edges of the phase voltage, $V_A$, are used for estimating a cycle period, P (see FIG. 11). Further, the cycle counter runs from one leading edge to the next; and, at the time when each leading edge triggers the controller 516, the controller 516 records the value of the cycle counter and then resets the cycle counter to zero (0). A filter (not shown) preferably filters consecutive recorded counts for accuracy. In this way, the alternator system 500 estimates the cycle period, P, of the reference, $V_A$.

In addition, the lower timing diagram of FIG. 11 represents the output of the gate transition counter cyclically running from a count of $Q_{ON}$ to $Q_{MAX}$, and from a count of $Q_{OFF}$ to $Q_{MAX}$. Specifically, counts of $Q_{ON}$ correspond with times when a particular switch A+, B+, or C+ is activated; and, counts of $Q_{OFF}$ correspond with times when a particular switch A+, B+, or C+ is deactivated. More specifically, respective times $A+_{ON}$, $B+_{ON}$, and $C+_{ON}$ when the switches A+, B+, or C+ are activated, and respective times $A+_{OFF}$, $B+_{OFF}$, and $C+_{OFF}$ when the switches A+, B+, or C+ are deactivated, can be determined using the estimated cycle period, P.

Figure 12:
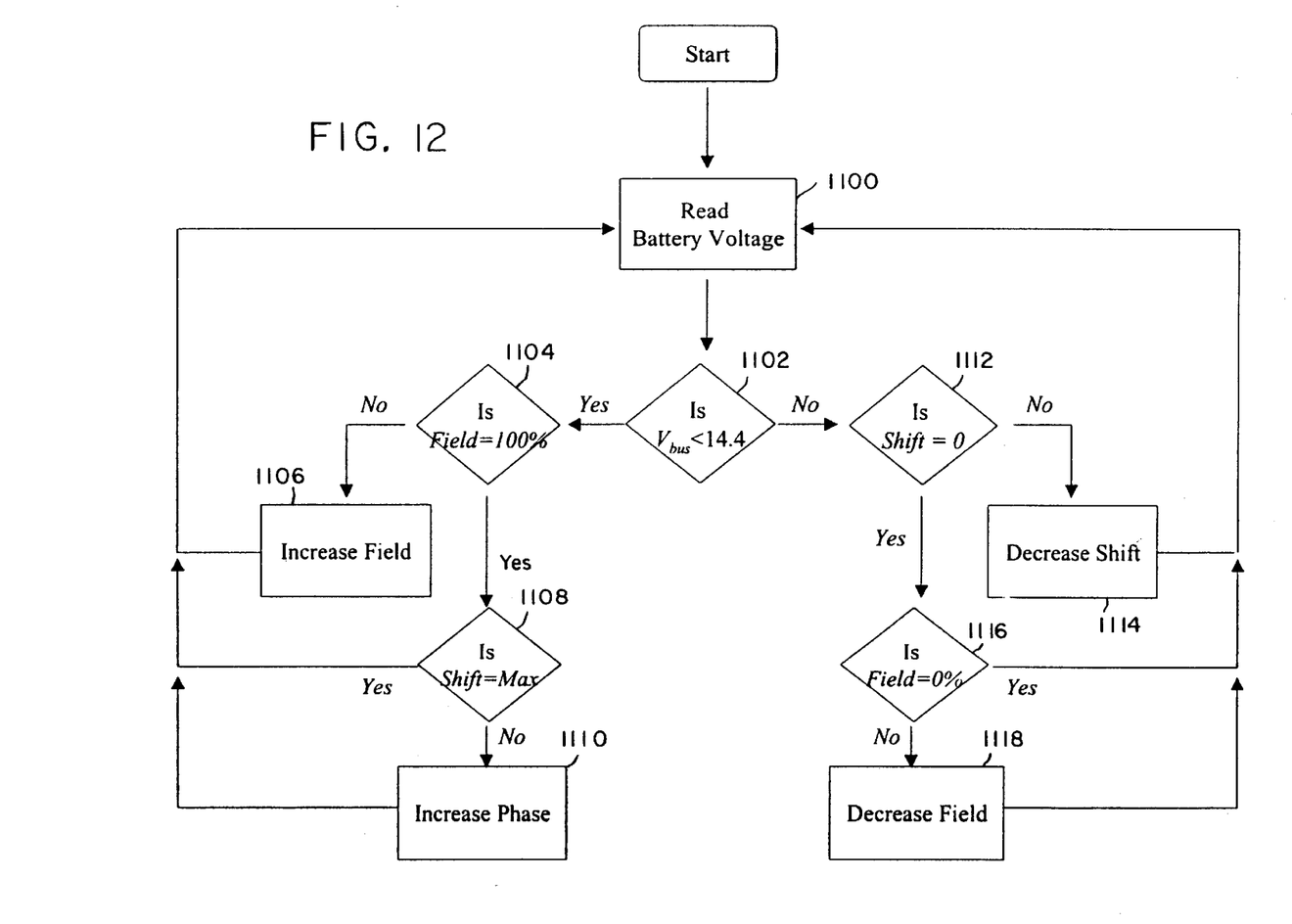
FIG. 12 is a flowchart showing the rotor field current and the stator voltage phase angle control logic for controlling the battery voltage of the alternator system of FIG. 5.

For example, the controller 516 is programmed for determining a base "ON" time, $T_{BASE}$, using the estimated cycle period, P; a duty time, $T_{ON}$; and, the times $A+_{ON}$, $B+_{ON}$, $C+_{ON}$, $A+_{OFF}$, $B+_{OFF}$, and $C+_{OFF}$. In this illustrative embodiment, the base "ON" time, $T_{BASE}$, is equal to the duty cycle, $T_{A,0}$, which corresponds with the natural commutation of the diodes 522A and 524A at the terminal A with the switch A+ in its deactivated or "open" position (see FIG. 6A). Further, the duty time, $T_{ON}$, is determined using the equation $$T_{ON} = T_{BASE} + T_{SHIFT} \quad (4)$$

where $T_{SHIFT}$ corresponds with a desired phase shift of the stator voltage, V, relative to the back EMF, E, and is determined using an illustrative procedure for providing closed-loop control of the alternator output power, as shown in FIG. 12.

In addition, because the stator winding 508 is a three-phase winding, $A+_{ON}$ occurs at the start of the cycle period, P; $B+_{ON}$ occurs at the time corresponding with the electrical angle $2\pi/3$, which is one-third (⅓) of the cycle period, P, or P/3; and, $C+_{ON}$ occurs at the time corresponding with the electrical angle $4\pi/3$, which is two-thirds (⅔) of the cycle period, P, or 2P/3. Times corresponding with $A+_{OFF}$, $B+_{OFF}$, and $C+_{OFF}$ are then determined using the equations $$A+_{OFF} = T_{ON} \quad (5)$$

$$B+_{OFF} = B+_{ON} + T_{ON} \quad (6)$$

$$C+_{OFF} = C+_{ON} + T_{ON} \quad (7)$$

The lower timing diagram of FIG. 11 shows the following order of events: $A+_{ON}$, $C+_{OFF}$, $B+_{ON}$, $A+_{OFF}$, $C+_{ON}$, and $B+_{OFF}$. This is because the duty time, $T_{ON}$, is typically greater than one-third (⅓) of the cycle period, P. The alternator system 500 therefore uses the transition counter for ensuring that the switches A+, B+, and C+ are activated and deactivated at the times determined as described above.

FIG. 12 shows a flowchart of the illustrative procedure for providing closed-loop control of the alternator output power. Specifically, the closed-loop control of the alternator output power is achieved by programming the controller 516 to control the field control circuit 520, thereby controlling the excitation current provided to the controlled field winding 518; and, to control the activation and the deactivation of the switches A+, B+, and C+ in the controlled rectifier bridge 506. As explained above, increasing/decreasing the excitation current provided to the field winding 518 increases/decreases the rotating flux wave produced by the rotor, thereby increasing/decreasing the back EMF, E, generated in the phases of the stator winding 508 and therefore increasing/decreasing the alternator output power. Further, manipulating the activation and deactivation of the switches A+, B+, and C+ in the controlled rectifier bridge 506 adjusts the delay of the stator voltage, V, relative to the back EMF, E, and therefore increases/decreases the alternator output power.

It should be understood that increasing/decreasing the alternator output power by controlling the activation and the deactivation of the switches A+, B+, and C+ is less efficient than by controlling the excitation current provided to the controlled field winding 518. This is because when controlling the activation and the deactivation of the switches A+, B+, and C+, any increase in the alternator output power is achieved with an output power factor that is smaller than unity. This means that the input power, $P_{in}$, increases faster than the corresponding output power, $P_{out}$.

For this reason, in the illustrative procedure of FIG. 12, the switches A+, B+, and C+ in the controlled rectifier bridge 506 are not activated for increasing the alternator output power until the excitation current provided to the field winding 518 reaches its maximum value, which occurs when the field control duty cycle is at 100%. The diodes 522A through 522C, and the diodes 524A through 524C, therefore operate as a conventional diode bridge until this maximum excitation current is reached. Thereafter, the switches A+, B+, and C+ are activated and deactivated to operate the controlled rectifier bridge 506 for further increasing the alternator output power. In addition, when decreasing the alternator output power, the excitation current is not decreased until the switches A+, B+, and C+ are manipulated to bring the output power factor back to unity. Thereafter, the diodes 522A through 522C, and the diodes 524A through 524C, again operate as a conventional diode bridge, and the excitation current provided to the field winding 518 is decreased for further decreasing the alternator output power.

It should be noted that even when the field control duty cycle is less than 100%, the switches A+, B+, and C+ are preferably activated and deactivated in the shadow of the natural commutation of the diodes 522A through 522C, and the diodes 524A through 524C, thereby increasing the efficiency of the alternator system 500. Such increased efficiency of the alternator system 500 was described above with reference to FIG. 7B, which shows the magnitude of the phase current, $I_{A,1}$, as being slightly greater than the magnitude of the phase current, $I_{A,0}$ (see FIG. 6B), even though the phase voltage, $V_{A,1}$, is still in phase with the phase current, $I_{A,1}$. The controller 516 is programmed for performing the illustrative procedure shown in FIG. 12 for providing closed-loop control of the alternator output power as follows. First, the voltage level of the battery 502 is read in block 1100. Next, it is determined in block 1102 whether or not the voltage level of the battery 502 is below a desired set voltage level; e.g., +14.4 Volts. If the voltage level is below the desired set voltage level, then it is determined in block 1104 whether or not the field winding 518 has reached its maximum value for increasing the alternator output power. In other words, it is determined in block 1104 whether or not the field control duty cycle is at 100%. If the field control duty cycle is not at 100%, then the controller 516 controls the field control circuit 520 in block 1106 for incrementally increasing the excitation current provided to the field winding 518, thereby increasing the alternator output power.

Alternatively, if the field control duty cycle is at 100%, then it is determined in block 1108 whether or not the phase shift of the stator voltage, V, relative to the back EMF, E, is at its maximum value. This corresponds with the situation wherein any additional phase shift of the stator voltage, V, relative to the back EMF, E, would cause a corresponding decrease in the alternator output power.

If the phase shift of the stator voltage, V, is not at its maximum value, then the phase shift is increased in block 1110 by incrementally increasing the value of $T_{SHIFT}$, which corresponds with the desired phase shift of the stator voltage, V, relative to the back EMF, E, as described above. In this way, the alternator output power is further increased. Alternatively, if the phase shift of the stator voltage, V, is at its maximum value, then the procedure merely returns to block 1100 for again reading the voltage level of the battery 502.

If instead it is determined in block 1102 that the voltage level of the battery 502 is not below the desired set voltage level, then it is determined in block 1112 whether or not the phase shift of the stator voltage, V, relative to the back EMF, E, is equal to zero (0). This corresponds with the situation wherein the diodes 522A through 522C, and the diodes 524A through 524C, operate as a conventional diode bridge.

If the phase shift of the stator voltage, V, is not equal to zero (0), then the phase shift is decreased in block 1114 by incrementally decreasing the value of $T_{SHIFT}$. In this way, the alternator output power is decreased. Alternatively, if the phase shift of the stator voltage, V, is equal to zero (0), then it is determined in block 1116 whether or not the field control duty cycle is at 0%.

If the field control duty cycle is not at 0%, then the controller 516 controls the field control circuit 520 in block 1118 for incrementally decreasing the excitation current provided to the field winding 518, thereby further decreasing the alternator output power. Alternatively, if the field control duty cycle is at 0%, then the procedure merely returns to block 1100 for again reading the voltage level of the battery 502.

Numerous advantages are derived from using the alternator system 500 and the procedure 1100 through 1118 of the present invention. For example, the present invention provides increased alternator output power while using only one sensor to derive a reference for triggering commutation of a half-wave controlled rectifier bridge. This significantly reduces the cost and the complexity of the alternator system 500 as compared with conventional actively controlled alternator systems. Moreover, the sensor used by the alternator system 500 is a voltage sensor, which is typically less costly than either current sensors or rotation sensors. Further, voltage sensors are generally more robust than rotation sensors such as rotor-mounted magnetic position sensors. For example, it is generally more likely that a magnetic receiver mounted on a rotor would be inadvertently damaged than a voltage sensor situated on a printed circuit board.

In addition, the present invention provides increased alternator output power while using only three active switches in the half-wave controlled rectifier bridge. This also significantly reduces the cost and the complexity of the alternator system 500 as compared with systems that use more active switches in, e.g., a full-wave controlled rectifier bridge.

Having described one embodiment, numerous alternative embodiments or variations might be made. For example, it was described above that the alternator system includes a half-wave controlled rectifier bridge, which has three (3) power switches A+, B+, and C+ and three (3) anti-parallel power diodes in an upper portion of the bridge; and, three (3) isolated power diodes in a lower portion of the bridge. However, this was merely an illustrative example. The three (3) power switches A+, B+, and C+ and the three (3) anti-parallel power diodes might alternatively be incorporated in the lower portion of the bridge, while the three (3) isolated power diodes are incorporated in the upper portion of the bridge.

It should be noted that incorporating the power switches A+, B+, and C+ and the anti-parallel power diodes in the upper portion of the bridge advantageously allows the switches A+, B+, and C+ to be implemented using a standard case-to-drain MOSFET configuration. It should also be noted that a charge pump or other like device (not shown) may be required for implementing control of the switches A+, B+, and C+ incorporated in the upper portion of the bridge.

In addition, it was described above that the alternator system includes a controller for sensing a timing trigger, $V_A$, at the terminal A. However, this was also merely an illustrative example. The controller might alternatively sense a timing trigger, $V_B$, at the terminal B; or, a timing trigger, $V_C$, at the terminal C. Consecutive leading edges of $V_B$ or $V_C$ might then be used for estimating the cycle period, P, thereby determining the base "ON" time, $T_{BASE}$; the duty time, $T_{ON}$; and, the times $A+_{ON}$, $B+_{ON}$, $C+_{ON}$, $A+_{OFF}$, $B+_{OFF}$, and $C+_{OFF}$, as described above.

Therefore, the invention should be limited only by the spirit and scope of the appended claims.

What is claimed is:

1. A charging system, comprising:

a battery;

a three-phase stator winding having a plurality of output connections;

a field winding magnetically coupled to the stator winding;

a controller; and a half-wave controlled rectifier bridge coupled between the output connections of the stator winding and the battery, wherein the half-wave controlled rectifier bridge includes a plurality of controllable rectifying elements coupled to a plurality of non-controllable rectifying elements at respective terminal nodes (A, B, C), the respective terminal nodes being coupled to the output connections of the stator winding, one of the terminal nodes being connected to the controller by a voltage sense line, and wherein the controller senses a plurality of edges on the voltage sense line for determining commutation timing of the controllable rectifying elements.

2. The charging system as recited in claim 1, wherein the controller is coupled to the controllable rectifying elements, and wherein the controller uses the determined commutation timing for controlling a phase timing of the controllable rectifying elements, thereby controlling the charging of the battery.

3. The charging system as recited in claim 1, further including a field control circuit coupled between the field winding and the controller, and wherein the controller controls the charging of the battery by controlling a duty cycle of the field winding.

4. The charging system as recited in claim 2, further including a field control circuit coupled between the field winding and the controller, and wherein the controller further controls the charging of the battery by controlling a duty cycle of the field winding.

5. The charging system as recited in claim 2, wherein the controllable rectifying elements include respective controllable switches, and wherein the controller controls the phase timing by determining switching points for the respective controllable switches.

6. The charging system as recited in claim 1, wherein the plurality of controllable rectifying elements is in an upper portion of the half-wave controlled rectifier bridge, and wherein the plurality of non-controllable rectifyg elements is in a lower portion of the half-wave controlled rectifier bridge.

7. The charging system as recited in claim 1, wherein the plurality of controllable rectifying elements is in a lower portion of the half-wave controlled rectifier bridge, and wherein the plurality of non-controllable rectifying elements is in an upper portion of the half-wave controlled rectifier bridge.

8. A method of operating a charging system as recited in claim 1, comprising the steps of:

(a) reading a voltage level of the battery, and determining whether the voltage level is less than or greater than a desired voltage level;

(b) if the voltage level is less than the desired voltage level, increasing an excitation current to the field winding if a field control duty cycle is less than 100%, and increasing a phase angle of the controllable rectifying elements if the field control duty cycle is at 100% and the phase angle is less than a predetermined value; and (c) if the voltage level is greater than the desired voltage level, decreasing the phase angle if the phase angle is not at 0 radians, and decreasing the excitation current if the phase angle is at 0 radians and the field control duty cycle is not at 0%.

9. The method as recited in claim 8, wherein the increasing and the decreasing of the phase angle in steps (b) and (c) include the substeps of sensing the plurality of edges on the voltage sense line, determining times, $T_{BASE}$ and P, using the sensed plurality of edges, $T_{BASE}$ corresponding with a natural commutation of the controllable rectifying element and the non-controllable rectifying element coupled at the voltage sense line, and P corresponding with a cycle period for the plurality of edges, determining a duty time, $T_{ON}$, using an equation $$T_{ON}=T_{BASE}+T_{SHIFT},$$

wherein $T_{SHIFT}$ is proportional to the phase angle, and determining times for activating ($A+_{ON}$, $B+_{ON}$, $C+_{ON}$) the controllable rectifying elements and for deactivating ($A+_{OFF}$, $B+_{OFF}$, $C+_{OFF}$) the controllable rectifying elements using equations $$A+_{ON}=0$$

$$A+_{OFF}=T_{ON}$$

$$B+_{ON}=P/3$$

$$B+_{OFF}=B+_{ON}+T_{ON}$$

$$C+_{ON}=2P/3$$

$$C+_{OFF}=C+_{ON}+T_{ON}.$$

10. The method as recited in claim 9, further including the step of activating and deactivating the controllable rectifying elements according to the determined times $A+_{ON}$, $B+_{ON}$, $C+_{ON}$ and $A+_{OFF}$, $B+_{OFF}$, $C+_{OFF}$.

* * * * *